(12) United States Patent
Youn et al.

(10) Patent No.: US 6,583,841 B2
(45) Date of Patent: Jun. 24, 2003

(54) IN-PLANE SWITCHING LCD PANEL WHEREIN PIXEL ELECTRODES AND COMMON ELECTRODES HAVING PLURALITY OF FIRST TIPS AND SECOND TIPS RESPECTIVELY

(75) Inventors: Won-Gyun Youn, Kyoungsangbuk-do (KR); In-Jae Chung, Kyoungsangbuk-do (KR)

(73) Assignee: LG.Philips LCD Co., Ltd., Seoul (KR)

( * ) Notice: Subject to any disclaimer, the term of this patent is extended or adjusted under 35 U.S.C. 154(b) by 10 days.

(21) Appl. No.: 09/732,767

(22) Filed: Dec. 11, 2000

(65) Prior Publication Data

US 2001/0013916 A1 Aug. 16, 2001

(30) Foreign Application Priority Data

Dec. 9, 1999 (KR) .......................... 1999-56020

(51) Int. Cl.[7] .................. G02F 1/1343; G02F 1/136; G09G 3/36; H01L 29/04
(52) U.S. Cl. .................. 349/141; 349/42; 349/139; 349/143; 349/146; 345/87; 257/59
(58) Field of Search .................. 349/141, 42, 43, 349/143, 146, 139; 345/87, 92; 257/59, 72

(56) References Cited

U.S. PATENT DOCUMENTS 5,929,829 A * 7/1999 Pitt .............................. 345/87

FOREIGN PATENT DOCUMENTS

| JP | 10-221705 | * | 8/1998 |
| JP | 11-223830 | * | 8/1999 |
| JP | 2000-56320 | * | 2/2000 |

OTHER PUBLICATIONS

N. Koma et al., "No–Rub Multidomain TFT–LCD Using Surrounding–Electrode Method," Sanyo Electric Co., Ltd., SID 95 Digest, pp. 869–872, 1995.

Y. Tanaka, et al. "Late–News Paper: A New Design to Improve Performance and Simplify the Manufacturing Process of High–Quality MVA TFT–LCD Panels," Fujitsu Ltd., SID Digest, pp. 206–208, 1999.

* cited by examiner

Primary Examiner—Tarifur R. Chowdhury
(74) Attorney, Agent, or Firm—McKenna Long & Aldridge LLP

(57) ABSTRACT

An array substrate of a liquid crystal display panel includes a substrate; a thin film transistor on the substrate; a pixel electrode having a plurality of first tips, the first tips being formed at at least one edge of the pixel electrode; and a common electrode having a plurality of second tips, the second tips being formed at at least one edge of the pixel electrode and the common electrode being parallel with the pixel electrodes.

30 Claims, 8 Drawing Sheets

IN-PLANE SWITCHING LCD PANEL WHEREIN PIXEL ELECTRODES AND COMMON ELECTRODES HAVING PLURALITY OF FIRST TIPS AND SECOND TIPS RESPECTIVELY

This application claims the benefit of Korean Patent Application No. 1999-56020, filed on Dec. 9, 1999, which is hereby incorporated by reference.

BACKGROUND OF THE INVENTION

1. Field of the Invention

The present invention relates to a liquid crystal display (LCD) device, and more particularly, to a liquid crystal display device implementing in-plane switching (IPS) where an electric field to be applied to liquid crystal is generated in a plane parallel to a substrate.

2. Discussion of the Related Art

Recently, liquid crystal display (LCD) devices with light, thin, low power consumption characteristics have been used in office automation (OA) equipments and video units and the like. Typically there are two types of LCDs—a twist nematic (TN) mode and a super twist nematic (STN) mode. Although TN-LCDs and STN-LCDs have been in wide use, they have a drawback of a very narrow viewing angle. In order to solve the problem, IPS-LCD devices have been proposed. An IPS-LCD device includes a lower substrate where a pixel electrode and a common electrode are disposed, an upper substrate having no electrode and a liquid crystal is interposed between the upper and lower substrates.

As shown in FIG. 1, lower and upper substrates 1a and 1b are spaced apart from each other, and a liquid crystal "LC" is interposed therebetween. The lower and upper substrates are called array and color filter substrates, respectively. On the lower substrate 1a, pixel and common electrodes 15 and 14 are disposed. The pixel and common electrodes 15 and 14 are parallel with and spaced apart from each other. On a surface of the upper substrate 1b, a color filter 25 is disposed facing the lower substrate 1a. The pixel and common electrodes 15 and 14 apply an electric field "E" to the liquid crystal "LC". The liquid crystal "LC" has a negative dielectric anisotropy, and thus it is aligned parallel with the electric field "E".

FIGS. 2 to 5 conceptually illustrate operation modes of a typical IPS-LCD device. When the electric field is not generated between the pixel and the common electrodes 15 and 14, the long axes of the LC molecules "LC" maintain an angle relative to a perpendicular line to the parallel pixel and common electrodes 15 and 14. For example, the angle is 45 degrees.

When the electric field is generated between the pixel and common electrodes 15 and 14, because both of the pixel and common electrodes 15 and 14 are formed on the lower substrate 1a, the in-plane electric field "E", which is parallel to the surface of the lower substrate 1a, is generated between the pixel and common electrodes 15 and 14. Accordingly, the LC molecules "LC" move to coincide the long axes thereof with the electric field direction, and the LC molecules "LC" become aligned such that the long axes thereof is parallel with the perpendicular line to the pixel and common electrodes 15 and 14.

By the above-mentioned operation modes and with additional elements such as polarizers and alignment layers, the IPS-LCD device displays images. The IPS-LCD device has wide viewing angles, low color dispersion qualities, and the fabricating processes thereof are simpler as compared to other LCD devices. But, since the pixel and common electrodes are disposed on the same plane of the lower substrate, the transmittance and aperture ratio are low.

For the sake of discussing the above-mentioned problem of the IPS-LCD device in detail, the structure of the IPS-LCD device will be described in detail with reference to FIGS. 6A and 6B.

FIG. 6A is a plan view illustrating in detail the structure of one pixel region in the IPS-LCD device, specifically, a unit pixel region 10. In addition, a cross-sectional view taken along a line "B—B" in FIG. 6A is illustrated in FIG. 6B.

On the surface of the transparent substrate 1A adjacent to the liquid crystal layer, a gate line (or scan signal line) 2 made of, for example, aluminum (Al) is formed extending along the x-direction. In addition, a common line (or reference signal line) 4 is formed extending along the x-direction, close to the gate line 2 on the +y-direction side thereof. The common line 4 is also made of, for example, Al. A region surrounded by the gate line 2, the common lines 4, and the data lines 3 constitutes a pixel region, as previously described.

In addition, the pixel region 10 includes a common electrode 14 formed by the common line 4, and another common electrode 14 formed adjacent to the gate line 2. The pair of horizontally extending common electrodes 14 are positioned adjacent to one of a pair of data lines 3 (on the right side of FIG. 6A), and are electrically connected to each other through a conductive layer 14A which is formed simultaneously with the common electrodes 14.

In the structure described above, the pair of common electrodes 14 extend in the direction parallel with the gate line 2. In other words, the common electrodes 14 take the form of a strip extending in a direction perpendicular to the data lines 3.

On the surface of the lower substrate 1a on which the gate lines and other lines discussed above are formed, a first insulating film 11 (see FIG. 6B) made of, for example, silicon nitride is formed overlying the gate line 2, the common lines 4, and the common electrodes 14. This first insulating film 11 functions as an inter-layer insulating film for insulating the gate line 2 and the common lines 4 from the data lines 3 as a gate-insulating layer for a region in which a thin film transistor "TFT" including a drain electrode 3a and a source electrode 15a is formed. The first insulating film 11 also acts as a dielectric film for a region in which a capacitor Cstg is formed. A semiconductor layer 12 for the TFT is formed near a cross point of the gate and data lines 2 and 3. On the other surface of the lower substrate 1a, a first polarization layer 18 is formed.

On the first insulating film 11, a pixel electrode 15 is formed parallel with the common electrode 14. An end portion thereof is electrically connected with the conductive layer 14a, and the other portion thereof is electrically connected with the source electrode 15a. A first planar film 16 is formed on the first insulating film 11 to cover the pixel electrode 15, and on the first planar film 16, a first alignment film 17 is formed.

FIG. 6B illustrates a cross-sectional view of the upper substrate 1b on which a black matrix 300 is formed. In the opening of the black matrix 300, a color filter 25 is formed to fill the opening. Then, a second planar film 27 is formed to cover the color film 25 and the black matrix 300, and a second alignment layer 28 is formed on the surface of the second planar film 27 facing the liquid crystal layer.

The color filter 25 is formed to define three sub-pixel regions adjacent to and extending along the data line 3 and including a red (R) filter, a green (G) filter, and a blue (B) filter, for example, from the top of the three sub-pixel regions. The three sub-pixel regions constitute one pixel region for a color display.

A second polarization layer 29 is arranged on the surface of the upper substrate 1b opposite to the surface adjacent to the liquid crystal layer on which various films are formed as described above.

In FIG. 6B, a voltage applied between the common electrodes 14 and the pixel electrode 15 causes an electric field E to be generated in the liquid crystal layer LC in parallel with the respective surfaces of the lower and upper substrates 1a, 1b. This is the reason why the illustrated structure is referred to as in-plane switching.

As shown in FIG. 7, if a distance "L" between the common and pixel electrodes 14 and 15 becomes longer, the aperture ratio problem can be solved. However, a larger "L" causes the threshold voltage to drive the liquid crystal to be higher. That is to say, the threshold voltage "$V_{th}$" is proportional to "L/d", where "d" is the width of the pixel electrode 15 ($V_{th}$ L/d). If the distance "L" becomes longer, the electric field generated between the pixel and common electrodes becomes weaker. Accordingly, the voltage difference between the pixel and common electrodes needs to be larger for a normal operation of the IPS-LCD device.

However, driving circuits that provide the voltage difference to the electrodes have limitations making it difficult to increase the voltage difference. Accordingly, the distance "L" can not be increased to solve the aperture ratio problem.

SUMMARY OF THE INVENTION

Accordingly, the present invention is directed to an IPS-LCD device that substantially obviates one or more of the problems due to limitations and disadvantages of the related art.

An advantage of the present invention is to provide an IPS-LCD device having a high aperture ratio.

Another advantage of the present invention is to provide an IPS-LCD device having a low threshold voltage.

Additional features and advantages of the invention will be set forth in the description which follows and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention provides a liquid crystal display device including a substrate; a thin film transistor on the substrate; a pixel electrode having a plurality of first tips, the first tips being formed at at least one edge of the pixel electrode; and a common electrode having a plurality of second tips, the second tips being formed at at least one edge of the pixel electrode, and the common electrode being substantially parallel with the pixel electrodes.

It is to be understood that both the foregoing general description and the following detailed description are exemplary and explanatory and are intended to provide further explanation of the invention as claimed.

BRIEF DESCRIPTION OF THE DRAWING

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiment of the present invention, example of which is illustrated in the accompanying drawings.

Figure 1:
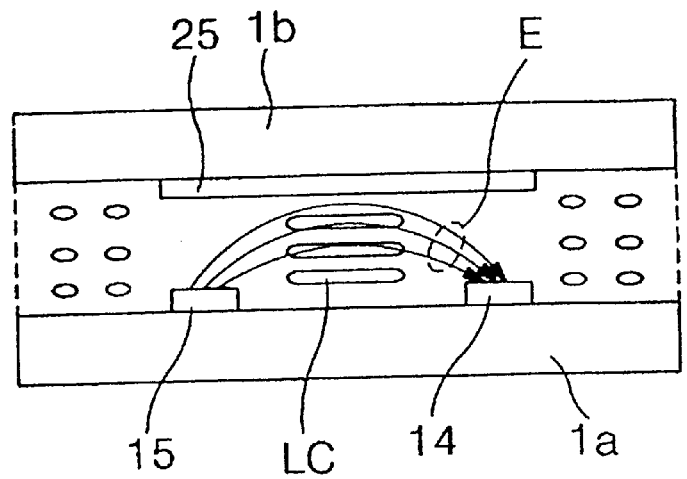
FIG. 1 is a cross sectional view illustrating a conventional IPS-LCD panel.
Figure 2:
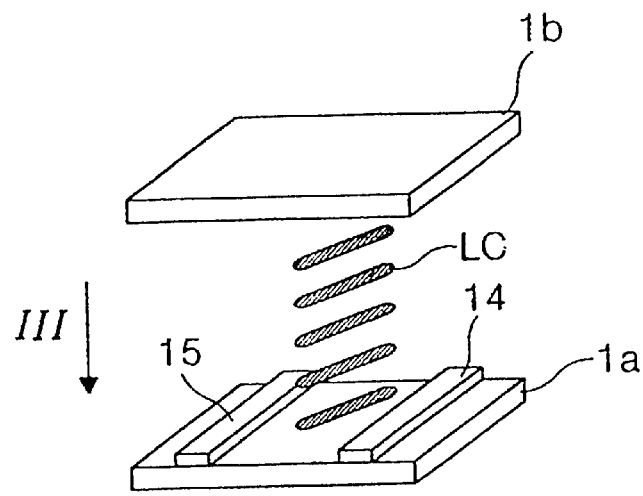
FIGS. 2 to 5 are perspective views illustrating operation modes of the conventional IPS-LCD device.
Figure 3:
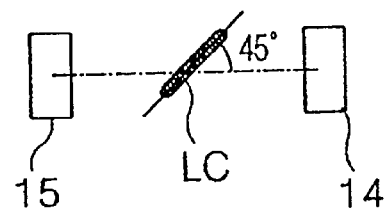
Figure 4:
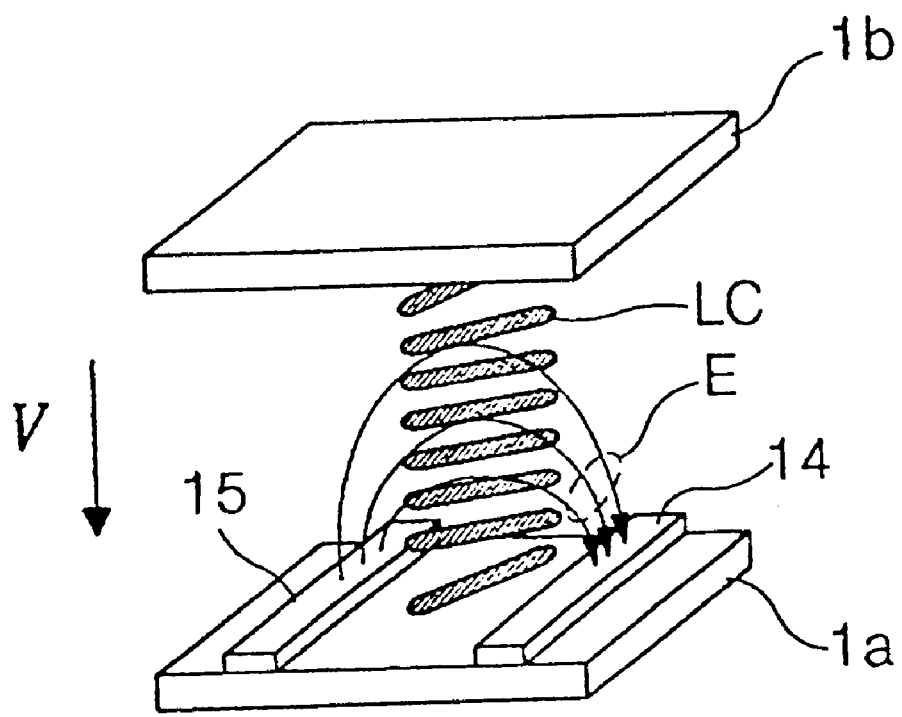
Figure 5:
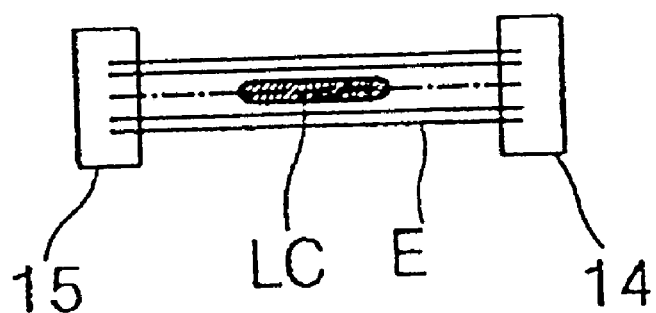
Figure 6A:
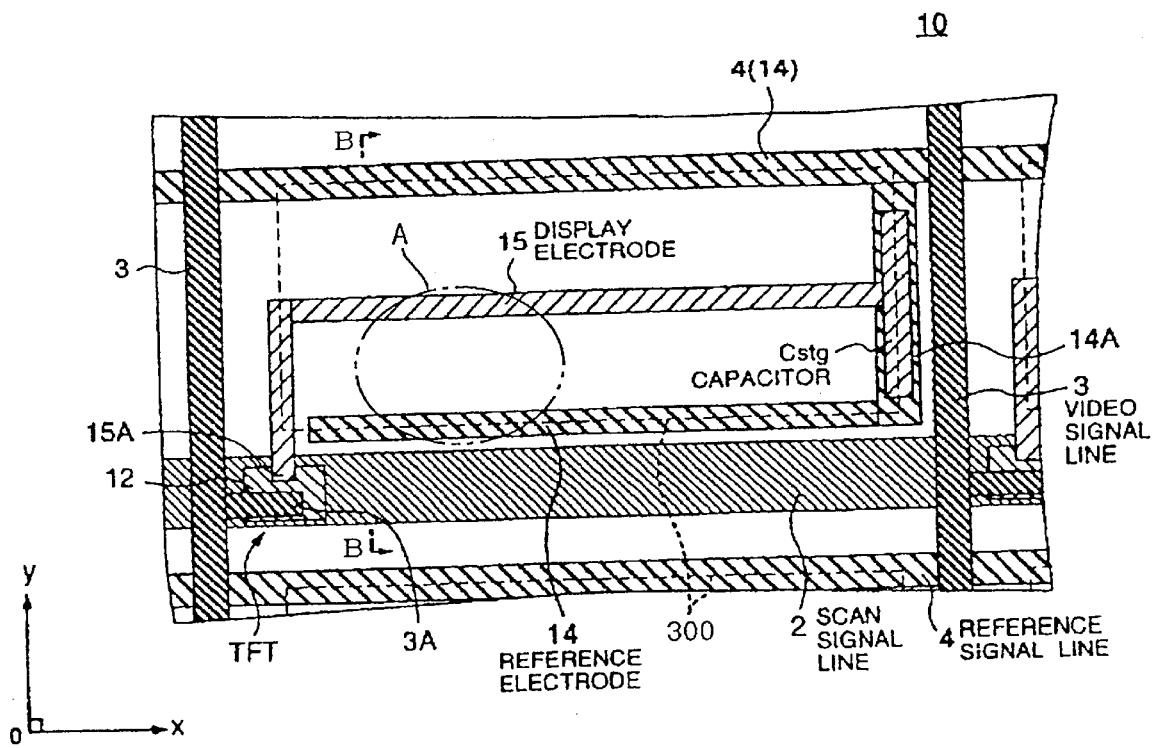
FIG. 6A is a plan view of a pixel region illustrating an embodiment of a liquid crystal display device according to the present invention.
Figure 6B:
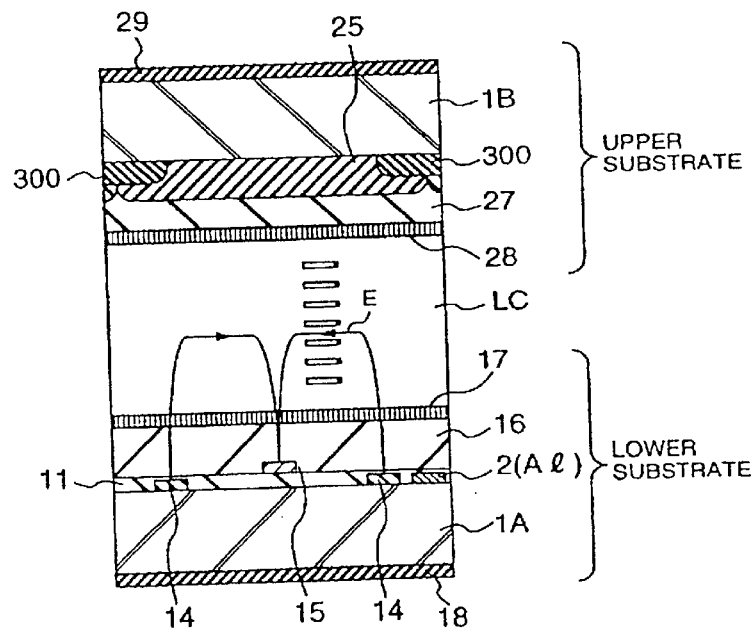
FIG. 6B is a cross-sectional view taken along a line "B—B" in FIG. 6A.
Figure 7:
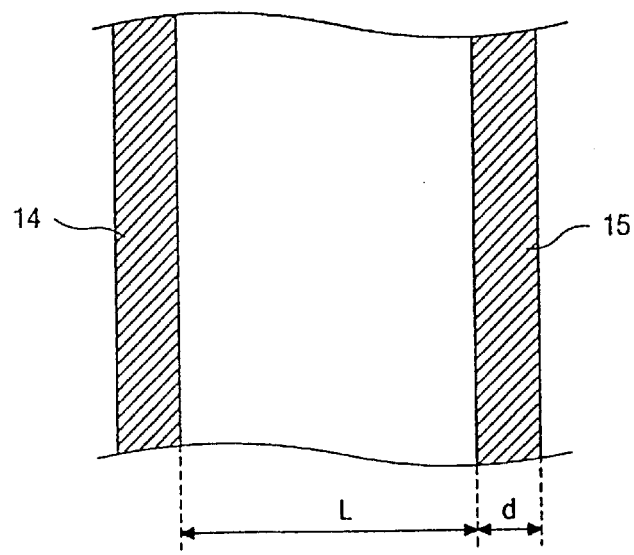
FIG. 7 is an enlarged view illustrating a portion "A" of FIG. 6A.
Figure 8:
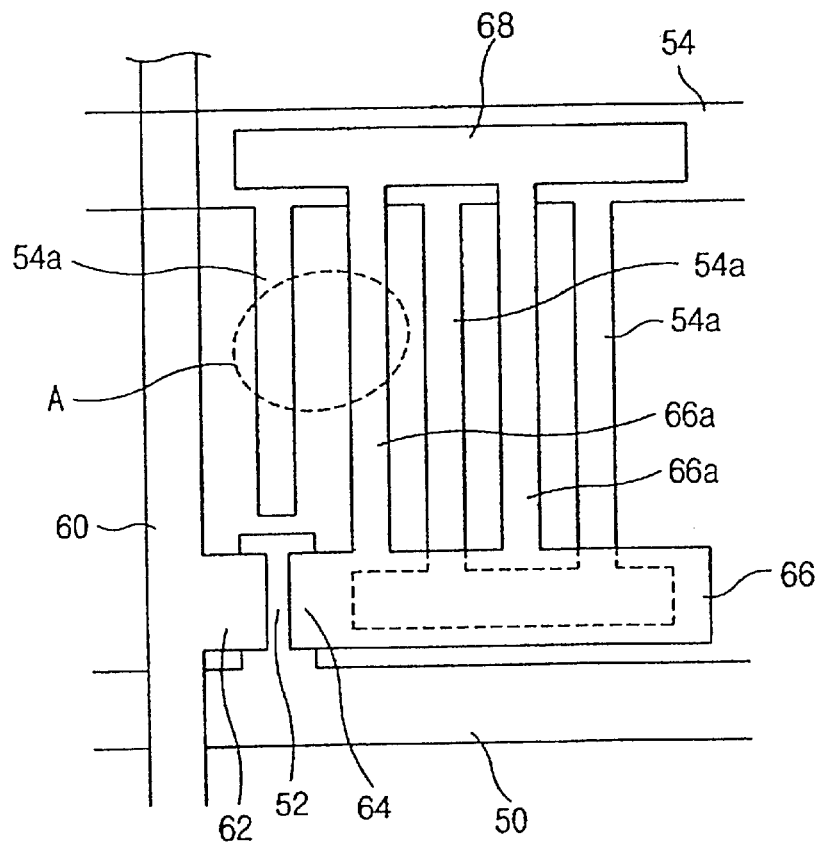
FIG. 8 is a plane view of an IPS-LCD device according to a preferred embodiment of the present invention.

As shown in FIG. 8, gate and common lines 50 and 54 are arranged transversely and parallel with each other. A data line 60 is arranged perpendicular to the gate and common lines 50 and 54. Near a cross point of the gate and data lines 50 and 60, gate electrode 52 and source electrode 62 are formed, preferably extending from the gate line 50 and the data line 60, respectively. The source electrode 62 overlaps a portion of the gate electrode 52.

A plurality of spaced apart common electrodes 54a are positioned perpendicular to the common line 54 and connected therewith. A first connecting line 66 is connected to the drain electrode 64, and a plurality of pixel electrodes 66a are positioned perpendicular to the first connecting line 66. First end portions of the pixel electrodes 66a are connected to the first connecting line 66, and second end portions of the pixel electrodes 66a are connected to a second connecting line 68 that is positioned over the common line 54. Accordingly, the common electrodes 54a and the pixel electrodes 66a are parallel with and spaced apart from each other in an alternating way.

FIGS. 9A to 9D illustrate a sequence of fabricating processes for the above-mentioned array substrate.

Figure 9A:
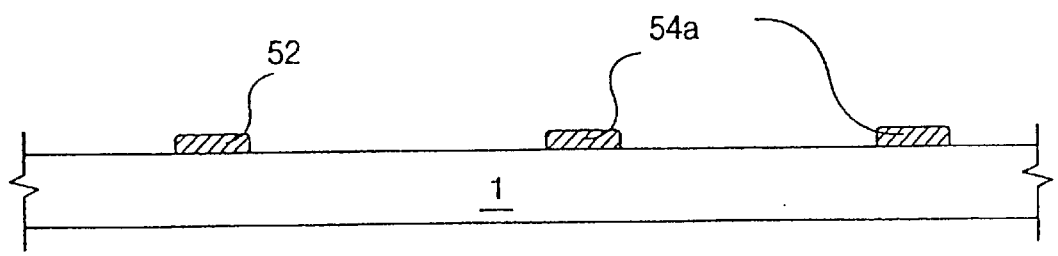
FIGS. 9A–9D illustrate a sequence of fabricating processes for the liquid crystal display device of the present invention.

In FIG. 9A, on the array substrate 1, a first metal layer is deposited and patterned to form the gate electrode 52 and the plurality of common electrodes 54a. The first metal layer is preferably selected from a group consisting of chromium (Cr), aluminum (Al), aluminum alloy (Al alloy), molybdenum (Mo), tantalum (Ta), tungsten (W), and antimony (Sb), and an alloy thereof.

Figure 9B:
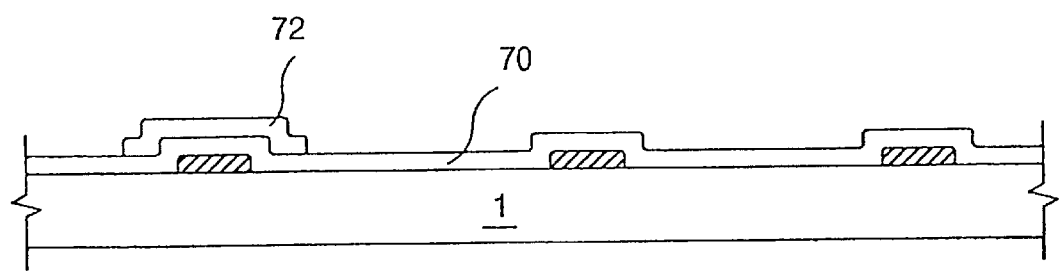

In FIG. 9B, a gate-insulating layer 70 is formed on the array substrate 1 to cover the gate and common electrodes 52 and 54a. On the gate-insulating layer 70, an active layer 72 is formed. The gate-insulating layer 70 preferably includes silicon nitride (SiNx) or silicon oxide (SiO$_2$), while the active layer 72 preferably includes an amorphous silicon (a-Si) layer and a doped amorphous silicon (n+ a-Si) layer.

Figure 9C:
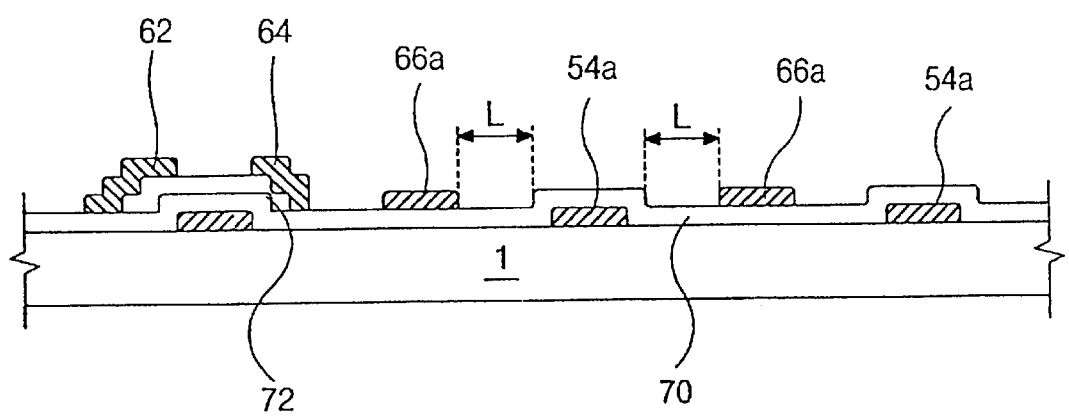

In FIG. 9C, a second metal layer is deposited and patterned to form the source and drain electrodes 62 and 64 on the active layer 72, and the pixel electrodes 66a on the gate-insulating layer 70. The pixel electrodes 66a are spaced apart from the adjacent common electrode 54a by a distance "L".

Figure 9D:
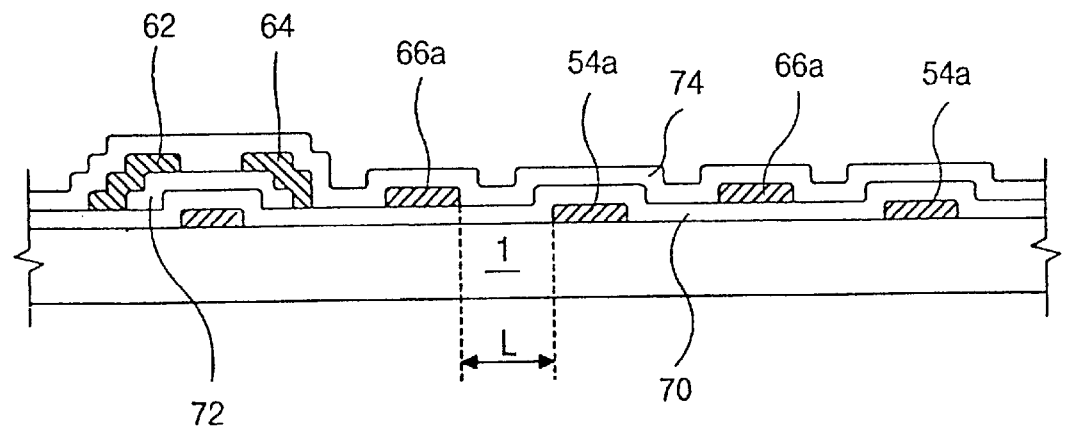

In FIG. 9D, a passivation layer 74 is formed to cover the source, drain, and pixel electrodes 62, 64, and 66a. The passivation layer 74 protects the source, drain, and pixel electrodes 62, 64, and 66a from, for example, outer humidity or contaminants.

Figure 9E:
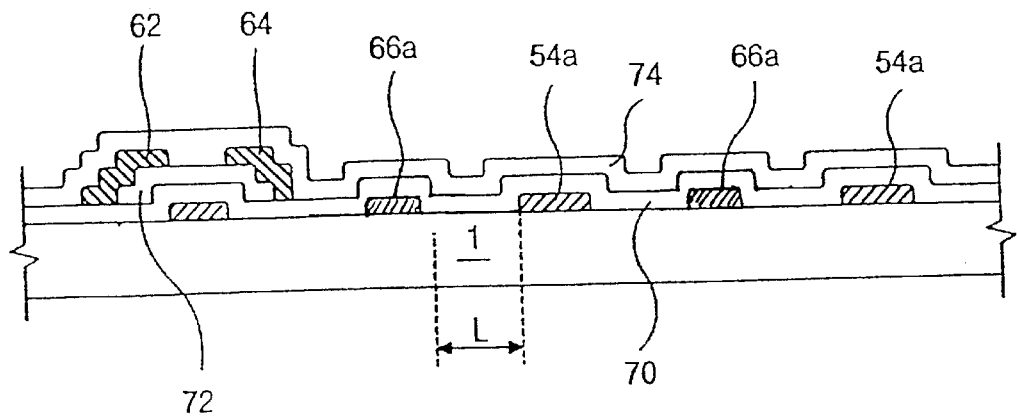
FIGS. 9E–9G illustrate alternative embodiments of the liquid crystal display device of the present invention.
Figure 9F:
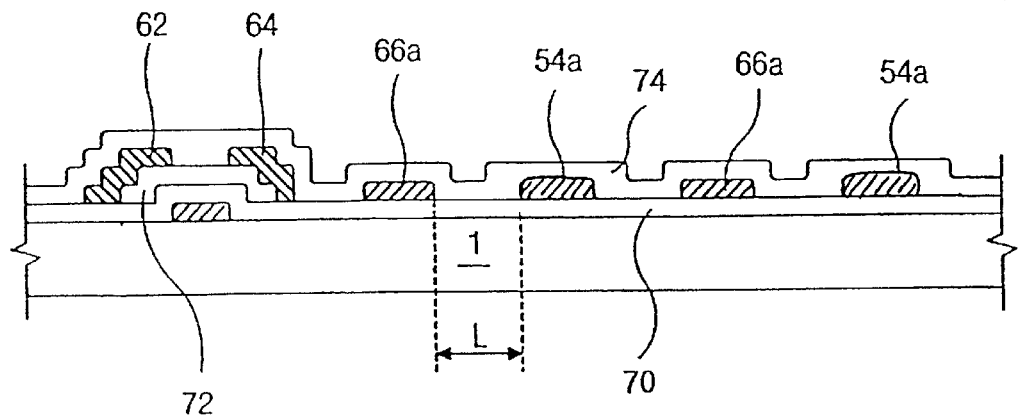
Figure 9G:
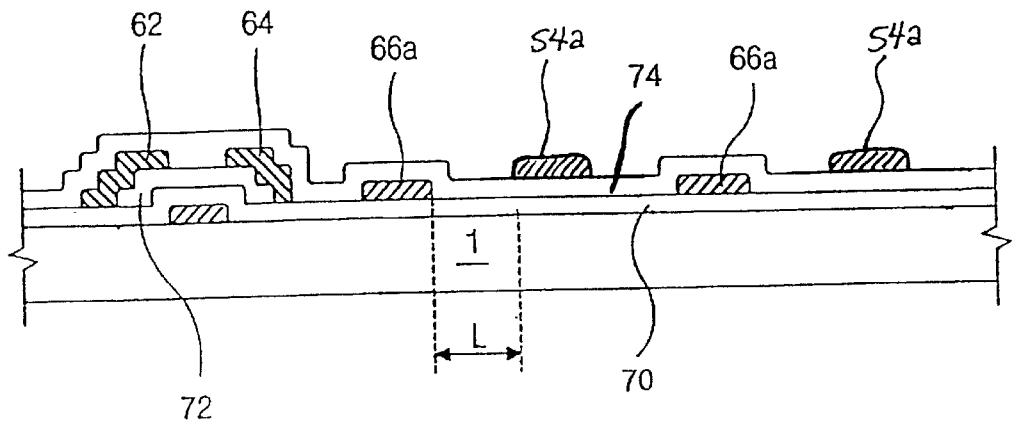

Although the figures illustrate the common and pixel electrodes as being formed in different or layers, they can be preferably formed in the same layer with the gate electrode 52 (see FIG. 9E) or alternatively, the drain and source electrodes 62 and 64 (see FIG. 9F). Further, the common electrode 54a can be formed on the passivation layer 74 with the pixel electrode 66a formed on the gate-insulating layer 70 (see FIG. 9G).

After forming the array substrate as shown in FIG. 9D, first and second orientation layers (not shown) are respectively formed on the array substrate 1 and a color filter substrate (not shown). The first and second orientation layers preferably include polyamic acid or polyimide. Thereafter, a liquid crystal layer is interposed between the first and second substrates.

Figure 10:
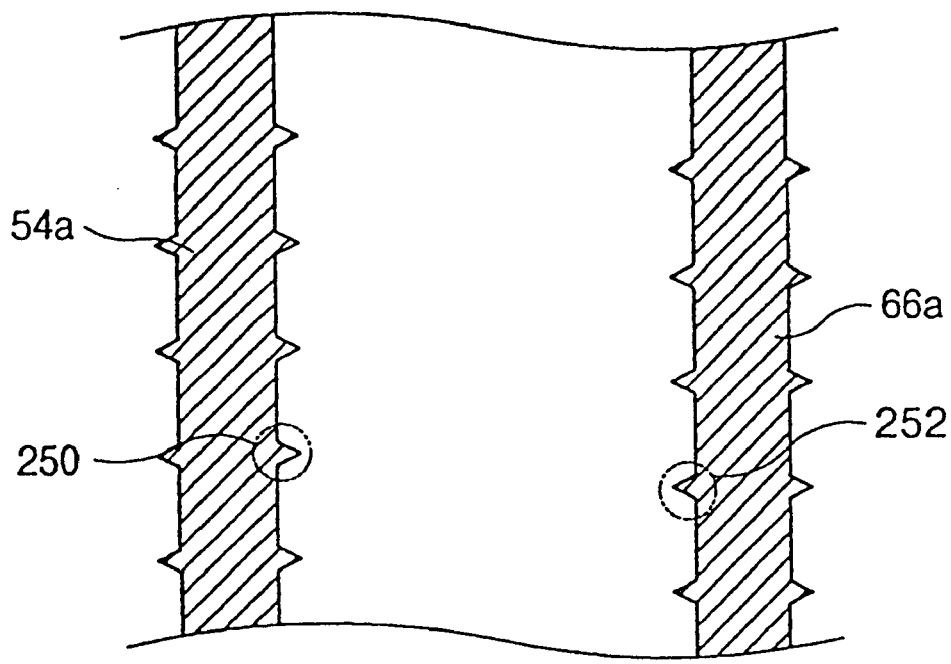
FIG. 10 is a enlarged plane view illustrating a portion "A" of FIG. 8.

FIG. 10 shows common and pixel electrodes 54a and 66a disposed on the array substrate shown in FIG. 8, according to a preferred embodiment of the present invention. As shown in FIG. 10, the common and pixel electrodes 54a and 66a are parallel with and spaced apart from each other. Along the edges of the common and pixel electrodes 54a and 66a, a plurality of first and second tips 250 and 252 protrude, respectively, which are spaced apart from each other. The first and second tips have a triangular shape in FIG. 10. The common and pixel electrodes 54a and 66a are preferably selected from a group consisting of chromium (Cr), aluminum (Al), aluminum alloy (Al alloy), molybdenum (Mo), tantalum (Ta), tungsten (W), antimony (Sb), and indium tin oxide (ITO), and an alloy thereof. The common and pixel electrodes 54a and 66a may be made of the same material or different materials and the tips, which preferably extend from each electrode, have the same material as the electrode. The first and second tips 250 and 252 preferably have the same structure.

When a voltage difference is applied to the common and pixel electrodes 54a and 66a, an electric field is generated between them. Since the electric field around the tips becomes stronger than that of the other regions, the sum of the electric field becomes stronger as compared with the conventional IPS-LCD device under the same condition. Accordingly, the IPS-LCD device according to the preferred embodiment of the present invention requires a lower threshold voltage for operation. In other words, to improve the aperture ratio, the distance between the pixel and common electrodes can be enlarged while maintaining a low threshold voltage.

Figure 11:
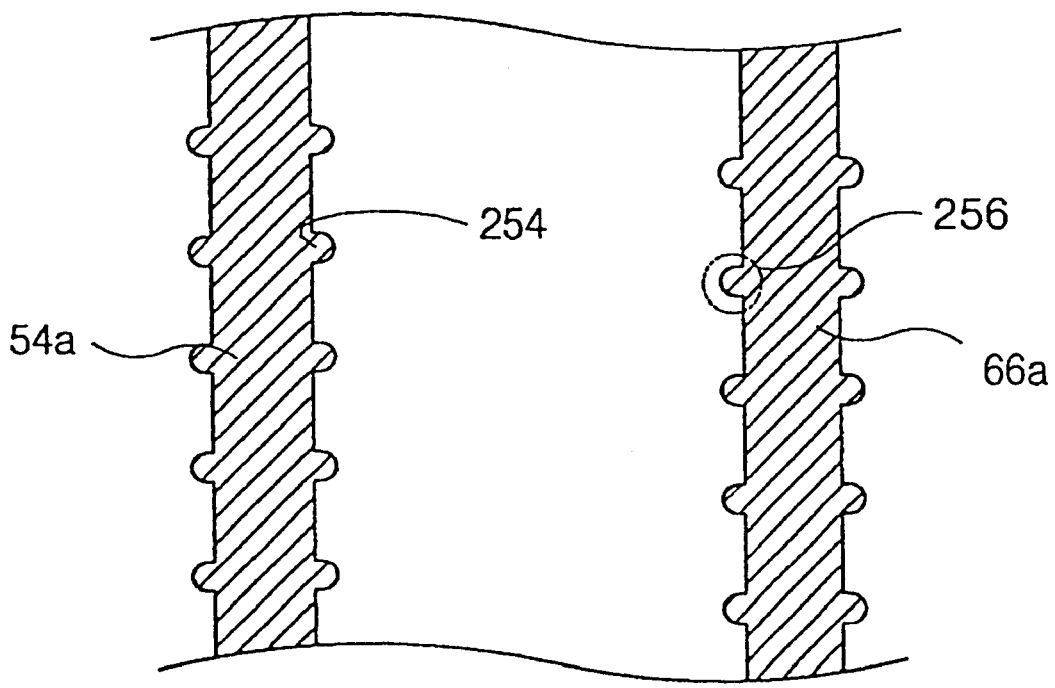
FIGS. 11 and 12 are plane views illustrating modifications of the preferred embodiment of FIG. 9.
Figure 12:
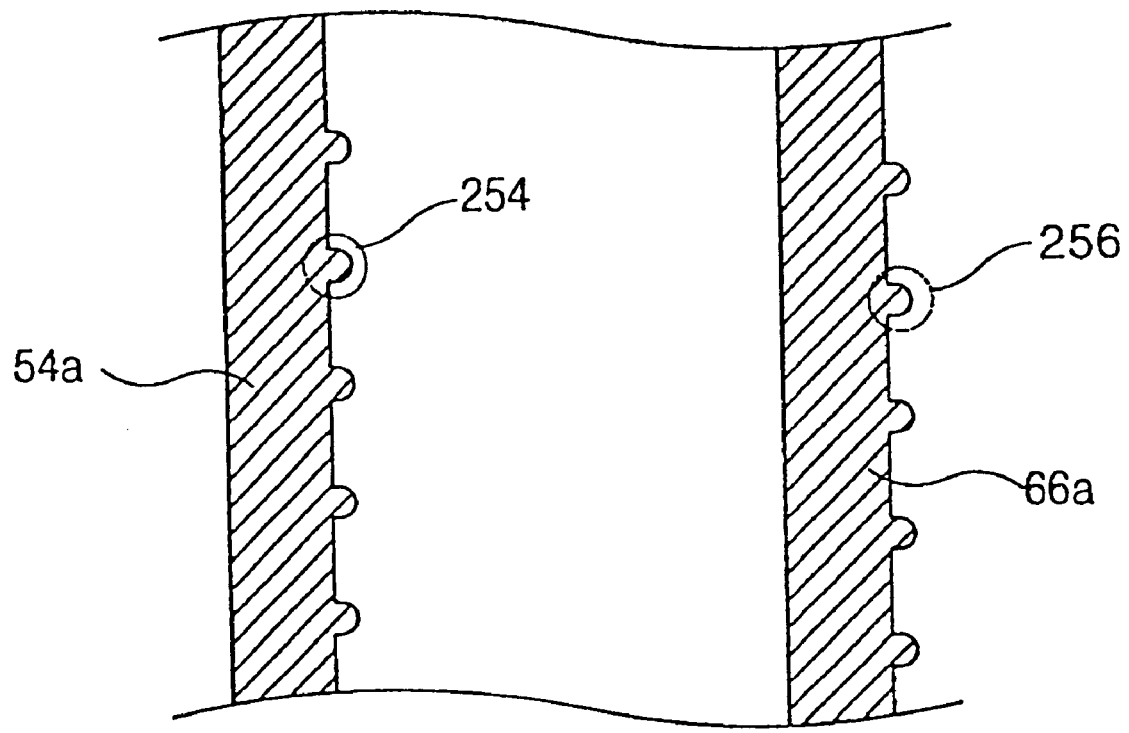

FIGS. 11 and 12 show modifications according to the preferred embodiments of the present invention. The first and second tips 254 and 256 preferably have a shape of a semicircle as opposed to a triangle as shown in FIG. 10. Further, as shown in FIG. 12, the common and pixel electrodes 54a and 66a preferably include the first and second tips 254 and 256, respectively, at only one edge of each of the electrodes. Although FIG. 11 shows the first and second tips protruding from the right edges, they may also protrude from the left edges.

Although the first and second tips are shown as having either a semicircular shape or a triangular shape, other shapes are also contemplated in the present invention such as a square shape or a rectangular shape, for example.

As described above, the preferred embodiment of the present invention has advantages of a low threshold voltage and high aperture ratio as compared to the conventional device.

It will be apparent to those skilled in the art that various modifications and variation can be made in the method of manufacturing a thin film transistor of the present invention without departing from the spirit or scope of the invention. Thus, it is intended that the present invention cover the modifications and variations of this invention provided they come within the scope of the appended claims and their equivalents.

What is claimed is:

1. A liquid crystal display device comprising:
   a substrate;
   a thin film transistor on the substrate;
   a pixel electrode having a plurality of first tips, the first tips being formed on at least one edge of the pixel electrode; and
   a common electrode having a plurality of second tips, the second tips being formed on at least one edge of the common electrode, and whereby an electric field is created relative to said pixel electrode and said common electrode having a threshold voltage in direct relation to a distance from an apex of one of said first tips to the at least one edge of said common electrode, wherein the distance from the apex of said first tip to the at least one edge of said common electrode is less than the distance between the pixel and common electrodes creating a uniform electric field.

2. The liquid crystal display device of claim 1, wherein at least one of the pixel and common electrodes includes a material selected from a group consisting of chromium (Cr), aluminum (Al), aluminum alloy (Al alloy), molybdenum (Mo), tantalum (Ta), tungsten (W), antimony (Sb), and indium tin oxide (ITO).

3. The liquid crystal display device of claim 1, further comprising an alignment layer on the pixel and common electrodes.

4. The liquid crystal display device of claim 3, wherein the alignment layer is selected from a group consisting of polyamic acid and polyimide.

5. The liquid crystal display device of claim 1, wherein the thin film transistor includes gate, source, and drain electrodes.

6. The liquid crystal display device device of claim 5, wherein the thin film transistor comprises:
   a gate electrode on the substrate;
   a gate insulating layer on the gate electrode;
   a semiconductor layer on the gate insulating layer; and
   source and drain electrodes on the semiconductor layer.

7. The liquid crystal display device of claim 5, wherein at least one of the pixel and common electrodes is on the same layer as the gate electrode.

8. The liquid crystal display device of claim 5, wherein at least one of the pixel and common electrodes is on the same layer as the source electrode.

9. The liquid crystal display device of claim 5, wherein the pixel electrode and the common electrode are on the same layer.

10. The liquid crystal display device of claim 9, wherein the pixel electrode is on the same layer as the gate electrode.

11. The liquid crystal display device of claim 9, wherein the pixel electrode is on the same layer as the source electrode.

12. The liquid crystal display device of claim 9, wherein at least one of the pixel and common electrodes is above source, drain and gate electrode layers.

13. A liquid crystal display device comprising:

a first substrate including a switching device;

a second substrate including a color filter;

a liquid crystal layer between the first and second substrates; and first and second electrodes on the first substrate, at least one of the first and second electrodes having a plurality of tips, and whereby an electric field is created relative to said first and second electrode, having a threshold voltage in direct relation to a distance from an apex of one of said tips to the at least one edge of an opposing electrode, wherein the distance from the apex of said tips to the at least one edge of said opposing is less than the distance between the first and second electrodes creating a uniform electric field.

14. The liquid crystal display device of claim 13, wherein at least one of the first and second electrodes includes a material selected from a group consisting of chromium (Cr), aluminum (Al), aluminum alloy (Al alloy), molybdenum (Mo), tantalum (Ta), tungsten (W), antimony (Sb), and indium tin oxide (ITO).

15. The liquid crystal display device of claim 13, further comprising a first alignment layer on the first substrate.

16. The liquid crystal display device of claim 15, wherein the first alignment layer is selected from a group consisting of polyamic acid and polyimide.

17. The liquid crystal display device of claim 13, further comprising a second alignment layer on the second substrate.

18. The liquid crystal display device of claim 17, wherein the second alignment layer is selected from a group consisting of polyamic acid and polyimide.

19. The liquid crystal display device of claim 13, wherein the first electrode and the second electrode are on the same layer.

20. The liquid crystal display device of claim 13, wherein the first electrode and the second electrode are on different layers.

21. The liquid crystal display device of claim 13, wherein the switching device includes a thin film transistor.

22. The liquid crystal display device of claim 21, wherein the thin film transistor includes a gate, a source, and a drain electrode.

23. The liquid crystal display device of claim 22, wherein the first and second electrodes are on the same layer as the gate electrode.

24. The liquid crystal display device of claim 22, wherein at least one of the first and second electrodes is on the same layer as the gate electrode.

25. The liquid crystal display device of claim 22, wherein at least one of the first and second electrodes is on the same layer as the source electrode.

26. The liquid crystal display device of claim 21, wherein the thin film transistor comprises:

a gate electrode on the substrate;

a gate insulating layer on the gate electrode;

a semiconductor layer on the gate insulating layer; and source and drain electrodes on the semiconductor layer.

27. The liquid crystal display device of claim 21, wherein the first electrode and the second electrode are on the same layer.

28. The liquid crystal display device of claim 27, wherein the first electrode is on the same layer as the gate electrode.

29. The liquid crystal display device of claim 27, wherein the first electrode is on the same layer as the source electrode.

30. The liquid crystal display device of claim 27, wherein at least one of the first and second electrodes is above source, drain and gate electrodes.

* * * * *

UNITED STATES PATENT AND TRADEMARK OFFICE
CERTIFICATE OF CORRECTION

PATENT NO. : 6,583,841 B2 Page 1 of 1
DATED : June 24, 2003
INVENTOR(S) : Won-gyun Youn et al.

It is certified that error appears in the above-identified patent and that said Letters Patent is hereby corrected as shown below:

Column 7,
Line 24, after "opposing" insert -- electrode --.

Signed and Sealed this

Twenty-seventh Day of January, 2004

JON W. DUDAS
*Acting Director of the United States Patent and Trademark Office*